May 27, 1930. G. A. WHITING ET AL 1,760,534
METHOD OF ARC WELDING
Filed June 23, 1927
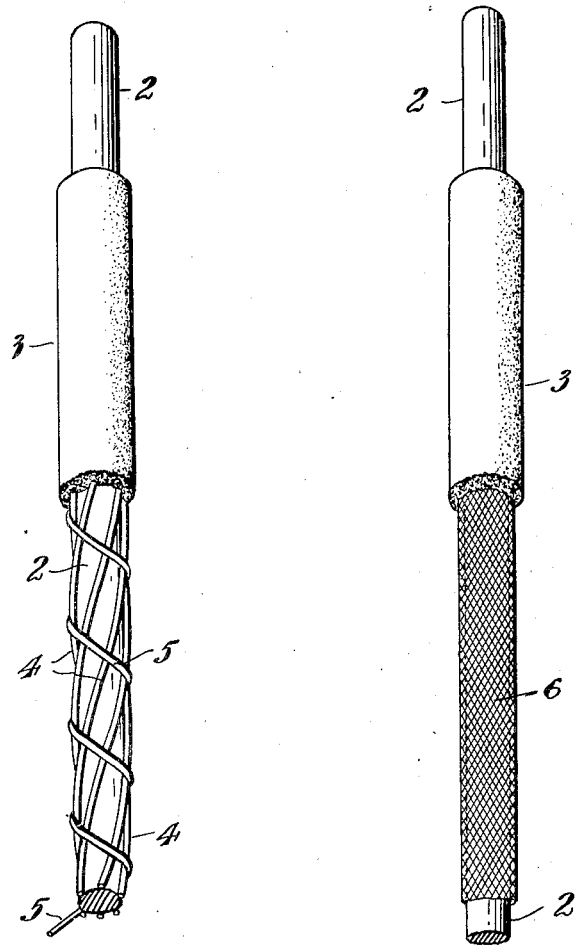
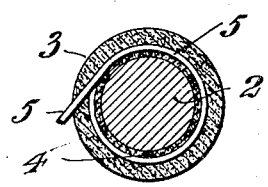
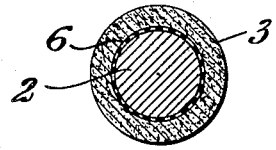
Inventors:
G. A. Whiting
AND
R. A. Holland
By Emil Bonnelycke
Attorney Patented May 27, 1930

1,760,534

UNITED STATES PATENT OFFICE

GEORGE AUGUSTINE WHITING, OF WINDSOR, VICTORIA, AND ROY ALGERNON HOLLAND, OF WEST BRUNSWICK, VICTORIA, AUSTRALIA, ASSIGNORS TO E. M. F. ELECTRIC COMPANY PROPRIETARY LIMITED, OF SOUTH MELBOURNE, VICTORIA, AUSTRALIA, A CORPORATION OF VICTORIA, AUSTRALIA

METHOD OF ARC WELDING

Application filed June 23, 1927, Serial No. 200,953, and in Australia July 9, 1926.

This invention relates to improvements in electrodes used in electric arc welding, and it includes an improved electrode structure and an improved means of protecting the fused metal of the weld against oxidation and nitrogenization. It has previously been proposed to protect welds from the atmosphere by creating or producing a reducing atmosphere around the arc and the fused metal of the weld. This has been accomplished by delivering a bathing stream of hydrogen gas to the arc from an outside source. Such method, although perhaps efficient to a certain degree, involving the use of a special type of welding apparatus and auxiliary appliances for supplying and controlling the flow of hydrogen gas to the electrode.

According to the present invention, free hydrogen gas is generated or produced at the arc itself from the coating or covering of the metal core of the electrode. This is preferably accomplished by the decomposition in the arc of an inorganic substance having a high combined water content. Numerous substances are usable for the purpose, but in our experiments we have obtained most efficient results when using a hydrated mineral oxide such as china clay. A supply of free carbon such as vegetable black is used in conjunction with the hydrated oxide to decompose the liberated water and generate hydrogen gas at the arc. The hydrated oxide is applied to the electrode in the form of a coating or covering, while a metallic or other reinforcement is ordinarily embodied in said coating or covering to adequately strengthen the same so as to resist breaking forces and to obviate the detachment of said coating or covering from the electrode core.

In the accompanying drawings:—

Figure 1 is a view partly in section of a covered welding electrode according to the invention.

Figure 2 is a cross-sectional view on an enlarged scale of the electrode shown in Figure 1.

Figure 3 is a view showing a modified form of electrode.

Figure 4 is a cross-sectional view of Figure 3.

In one practical embodiment of the invention, we coat or cover the metallic electrode cores 2 with a mixture containing ordinary fluxes and slag-producers, china clay (hydrated oxide of alumina), vegetable black or a like carbonaceous material, and a binding substance such as silicate of soda (water-glass). The coating mixture is ordinarily applied in paste form and after being applied to the electrode core is thoroughly dried, preferably by hot air treatment, to remove any uncombined moisture. The mixture may contain, for example, 20% china clay and 10% lamp black, the remainder comprising the usual fluxes, slag-producers, etc.

In the use of the electrode, the combined water of the hydrated oxide in the coating is liberated by the heat of the arc and is decomposed by the action of the free carbon forming carbon monoxide and free molecular hydrogen ($H_2$). This hydrogen produces a reducing atmosphere completely around the arc and the fused metal of the weld, excluding air therefrom and preventing oxidation and nitrogenization of the fused metal. Part of the liberated molecular hydrogen passes downwardly through the arc wherein it is converted by the high temperature into atomic hydrogen (H) with the absorption of considerable latent energy, and this atomic hydrogen passes into intimate contact with the fused metal of the weld and the molten metal desposited by the electrode. At this point the atomic hydrogen is re-converted to molecular hydrogen, and the latent energy of dissociation is given out and absorbed by the fused metal. By this means the effective heat derived from the arc is greatly increased, and in consequence thereof less current than is ordinarily required may be used.

The nascent or atomic hydrogen being chemically active has a powerful purifying action upon the fused metal of the weld and, furthermore, it either removes or reduces in a satisfactory manner oxides and occluded gases in the deposited metal, thus ensuring requisite strength of the weld. The silicate of soda used in the coating mixture fuses in the heat of the arc and forms a substantially mastic layer above the crater of the electrode, thereby preventing the liberated molecular hydrogen from escaping upwardly from the arc.

The amount of vegetable black or other carbonaceous material used in the electrode coating 3 will vary according to the combined water content of the hydrated oxide that is used, climatic and other conditions, while the quantities of fluxes and slag-producers will ordinarily be just sufficient to form a thin coating over the fused metal to protect it from the atmosphere during cooling or freezing. The coating 3 preferably has a metallic reinforcement which is embodied within the coating to strengthen it against breaking forces and against detachment from the electrode core 2. In the construction of electrode illustrated in Figures 1 and 2, the reinforcement consists of a series of metal wires suitably twisted around the core 2. Ordinarily, six spaced wires 4 are twisted around the core 2 in one direction, and a tying wire 5 is then wound around the electrode in the opposite direction to secure the spaced wires 4 in position. The tying wire 5 is preferably wound at a considerably finer pitch than the spaced wires 4 so as to prevent any twisting movement of the latter wires.

The wires 4 and 5 form around the electrode core 2 a substantially cellular structure which ensures firm adhesion of the coating mixture and effectively strengthens the coating against fracture and also against detachment from the core 2 under the rough usage to which the electrodes are oftentimes subjected.

According to the electrode construction which is illustrated in Figures 3 and 4, a wire mesh reinforcement in the form of a woven sleeve 6 is fitted around the electrode core 2 to strengthen the coating 3. In other constructions the reinforcement may consist of stranded wire or wire braid wound around the core 2, or be composed of wire strands interwoven around the said core. Alternatively, the reinforcement may consist of metal filings or metal chips incorporated in the coating mixture.

During use of the improved electrode, the metallic reinforcement is melted simultaneously with the core 2 and is deposited therewith upon the welding work being performed. The reinforcement is preferably formed of high carbon steel or nichrome alloy to improve the strength of the weld, but for special metallurgical purposes it may be composed of nickel or other suitable metal or alloy.

In lieu of the metallic reinforcement for the coating 3, a fibrous strengthening material such as asbestos, slag wool or bluestone wool may be used. In this adaptation the bare metal cores 2 of the electrodes are first coated with silicate of soda or other suitable adhesive substance, and the fibrous material is blown onto the electrodes in a loose state by a hot air blast. After the fibrous material has been applied, the electrodes are dried to effect thorough adhesion of the fibrous material, and the coating mixture is then applied thereto. The electrodes are now subjected to a smoothing or wiping operation by any suitable device following which operation the electrodes are finally dried.

What we do claim is:—

A method of arc welding, comprising the steps of springing an arc between the work and a welding electrode embodying a metal core provided with a coating containing a supply of free carbon and a hydrated inorganic substance having a high combined water content; liberating the water of said inorganic substance by the heat of the arc; decomposing the liberated water by the carbon so as to produce free molecular hydrogen for creating a reducing atmosphere around the arc and the fused metal of the weld to protect said fused metal from the atmosphere; converting part of the molecular hydrogen into atomic hydrogen by the high temperature; and passing the atomic hydrogen into contact with the fused metal of the weld to re-convert it into molecular hydrogen.

In testimony whereof we affix our signatures.

GEORGE AUGUSTINE WHITING.
ROY ALGERNON HOLLAND.